United States Patent
Coretto et al.

(10) Patent No.: US 11,906,063 B2
(45) Date of Patent: Feb. 20, 2024

(54) PRESSURE ACTUATED SWITCHING VALVE

(71) Applicant: Hamilton Sundstrand Corporation, Charlotte, NC (US)

(72) Inventors: August M. Coretto, Windsor, CT (US); David J. Zawilinski, West Granby, CT (US); Scott W. Simpson, Feeding Hills, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 253 days.

(21) Appl. No.: 17/581,038

(22) Filed: Jan. 21, 2022

(65) Prior Publication Data

US 2023/0235831 A1 Jul. 27, 2023

(51) Int. Cl.
*F16K 15/06* (2006.01)
*F16K 27/02* (2006.01)

(52) U.S. Cl.
CPC ........ *F16K 27/0209* (2013.01); *F16K 15/063* (2013.01)

(58) Field of Classification Search
CPC ............... F16K 27/0209; F16K 15/063; F16K 17/0473; B64C 25/44
See application file for complete search history.

(56) References Cited

U.S. PATENT DOCUMENTS

| | | |
|---|---|---|
| 3,289,689 A | 12/1966 | Hiroto et al. |
| 5,799,688 A | 9/1998 | Yie |
| 7,000,895 B2 | 2/2006 | Gessaman |
| 9,689,315 B2 | 6/2017 | Marocchini et al. |
| 10,441,826 B2 | 10/2019 | Dunn et al. |
| 10,513,977 B2 | 12/2019 | Defelice et al. |
| 2014/0166138 A1* | 6/2014 | Bisig ...................... B23P 11/00 29/890.12 |

(Continued)

FOREIGN PATENT DOCUMENTS

| | | |
|---|---|---|
| CN | 110715066 A | 1/2020 |
| EP | 3318426 A1 | 5/2018 |

(Continued)

OTHER PUBLICATIONS

European Application No. 23150950.6 filed Jan. 10, 2023; Extended European Search Report dated Jun. 15, 2023; 12 pages.

*Primary Examiner* — P. Macade Nichols
(74) *Attorney, Agent, or Firm* — CANTOR COLBURN LLP

(57) ABSTRACT

A pressure actuated switching valve includes a first valve chamber including a first chamber portion. The first chamber portion has a first inner diameter, a second chamber portion having a second inner diameter that is greater than the first inner diameter, a third chamber portion having a third inner diameter that is greater than the first inner diameter, a fourth chamber portion having a fourth inner diameter that is greater than first inner diameter, and a valve member. The valve member includes a first section having a first outer diameter that is greater than the first inner diameter. A second section of the valve member has a second outer diameter that is closely matched to the third inner diameter. A third section of the valve member is arranged has a third outer diameter that is greater than the first outer diameter.

20 Claims, 4 Drawing Sheets

(56) References Cited

U.S. PATENT DOCUMENTS

| | | | | |
|---|---|---|---|---|
| 2016/0102772 A1* | 4/2016 | Smith | ................. | F16K 27/0209 |
| | | | | 137/12 |
| 2018/0128390 A1 | 5/2018 | Lin et al. | | |
| 2022/0299122 A1* | 9/2022 | Shetty | .................... | B64C 25/44 |

FOREIGN PATENT DOCUMENTS

| | | | |
|---|---|---|---|
| EP | 3537018 A1 | 9/2019 | |
| EP | 3816493 A1 | 5/2021 | |

* cited by examiner

PRESSURE ACTUATED SWITCHING VALVE

BACKGROUND

Exemplary embodiments pertain to the art of valves and, more particularly, to a pressure actuated switching valve.

Valves for controlling fluid flow are ubiquitous in the art. Valves may be electrically controlled, hydraulically controlled, mechanically controlled, and/or pressure controlled. All valves inherently have a hysteresis or, a difference in signal level between activation signal (to move from a first to a second position) and a de-activation signal (to move back from the second position to the first). Hysteresis may depend on friction, application pressures, and other properties of the valve. One example of hysteresis is a solenoid valve electrically opening at 25 mA, but closing again at 20 mA, for a hysteresis of 5 mA.

Typically, electrically activated valves such as solenoid valves possess a low hysteresis and pressure activated valves, such as ball valves have a higher hysteresis. Frictional forces, flow forces, and pressure application time associated with moving a ball off of a ball seat and then back again lead to a higher hysteresis. Slower control responses associated with a high hysteresis can lead to undesirable valve leakage, process cycling, and control variances. However, there is a desire for low hysteresis pressure activated valves such that valves can be passively controlled.

BRIEF DESCRIPTION

Disclosed in accordance with a non-limiting example is a pressure actuated switching valve including a valve chamber including a first chamber portion defining an inlet, the first chamber portion having a first inner diameter, a second chamber portion defining an outlet, the second chamber portion having a second inner diameter that is greater than the first inner diameter, a first sealing surface defined between the first chamber portion and the second chamber portion, a third chamber portion having a third inner diameter that is greater than the first inner diameter, a fourth chamber portion having a fourth inner diameter that is greater than first inner diameter, a fifth chamber portion, a second sealing surface defined at an interface of the fourth chamber portion and the fifth chamber portion, and a valve member slidingly arranged in the valve chamber. The valve member includes a first section arranged in the second chamber portion. The first section has a first outer diameter that is greater than the first inner diameter and is configured to selectively engage the sealing surface. A second section of the valve member is arranged in the third chamber portion. The second section has a second outer diameter that is closely matched to the third inner diameter. A third section of the valve member is arranged in the fourth chamber portion, the third section has a third outer diameter that is greater than the first outer diameter, the second outer diameter, and the second inner diameter, and is configured to selectively engage the sealing surface.

Additionally, or alternatively, in this or other non-limiting examples a spring arranged in the fifth chamber portion, the spring engaging the third section of the valve member, wherein the spring biases the valve member toward the sealing surface.

Additionally, or alternatively, in this or other non-limiting examples the valve chamber includes a first chamber section and a second chamber section, wherein the first chamber section is mechanically connected to the second chamber section.

Additionally, or alternatively, in this or other non-limiting examples, the first chamber section is selectively detachably connected to the second section.

Additionally, or alternatively, in this or other non-limiting examples, the third section of the valve member is detachably connected to the second section of the valve member.

Additionally, or alternatively, in this or other non-limiting examples, the second outer diameter is greater than the first outer diameter.

Additionally, or alternatively, in this or other non-limiting examples, the third outer diameter is greater than the second outer diameter.

Additionally, or alternatively, in this or other non-limiting examples, a first end portion of the second section extends into the second chamber portion and a second end portion of the second section extends into the fourth chamber portion.

Also disclosed in accordance with a non-limiting example, is an aircraft including a fuselage, at least one engine is supported by the fuselage, a mechanical system is arranged in the fuselage. The mechanical system includes a pressure actuated switching valve including a valve chamber including a first chamber portion defining an inlet, the first chamber portion having a first inner diameter, a second chamber portion defining an outlet, the second chamber portion having a second inner diameter that is greater than the first inner diameter, a first sealing surface defined between the first chamber portion and the second chamber portion, a third chamber portion having a third inner diameter that is greater than the first inner diameter, a fourth chamber portion having a fourth inner diameter that is greater than first inner diameter; a fifth chamber portion, a second sealing surface defined at an interface of the first chamber portion and the second chamber portion, and a valve member slidingly arranged in the valve chamber. The valve member includes a first section arranged in the second chamber portion, the first section having a first outer diameter that is greater than the first inner diameter and being configured to selectively engage the sealing surface, a second section arranged in the third chamber portion, the second section having a second outer diameter that is closely matched to the third inner diameter, and a third section arranged in the fourth chamber portion having a third outer diameter that is greater than the first outer diameter, the second outer diameter, and the second inner diameter.

Additionally, or alternatively, in this or other non-limiting examples, a spring arranged in the fifth chamber portion, the spring engaging the third section of the valve member, wherein the spring biases the valve member toward the sealing surface.

Additionally, or alternatively, in this or other non-limiting examples, the valve chamber includes a first chamber section and a second chamber section, the first chamber section being mechanically connected to a second chamber section.

Additionally, or alternatively, in this or other non-limiting examples, the first chamber section is selectively detachably connected to the second chamber section.

Additionally, or alternatively, in this or other non-limiting examples, the third section of the valve member is detachably connected to the second section of the valve member.

Additionally, or alternatively, in this or other non-limiting examples, the second outer diameter is greater than the first outer diameter.

Additionally, or alternatively, in this or other non-limiting examples, the third outer diameter is greater than the second outer diameter.

Further disclosed in accordance with a non-limiting example is a method of operating a pressure actuated switching valve including introducing a fluid into a valve chamber having a first chamber portion including a first inner diameter, a second chamber portion having a second inner diameter that is greater than the first inner diameter, a third chamber portion having a third inner diameter that is greater than the first inner diameter, a fourth chamber portion having a fourth inner diameter that is greater than first inner diameter, and a fifth chamber portion, snapping the pressure actuated switching valve open by unseating a first section of a valve member from a sealing surface defined between the first chamber and the second chamber portion with a first fluid pressure directed at the first section, holding the pressure actuated switching valve open with the first fluid pressure acting on the first section and a second fluid pressure acting on a third section of the valve member in the fifth chamber portion, passing a portion of the first fluid through an outlet connected to the second chamber portion, reducing the first fluid pressure, and snapping the valve member closed seating the first section on the sealing surface with a spring positioned in the fifth chamber portion.

Additionally, or alternatively, in this or other non-limiting examples, snapping the valve member closed includes applying pressure to the third section of the valve member.

Additionally, or alternatively, in this or other non-limiting examples, applying pressure to the third section includes applying a biasing force to the third section with a spring.

Additionally, or alternatively, in this or other non-limiting examples, snapping the pressure actuated switching valve open includes passing a fluid from the fifth chamber portion into the fourth chamber portion around the third section.

Additionally, or alternatively, in this or other non-limiting examples, preventing fluid in the fourth chamber portion from passing into the third chamber portion with a second section of the valve member disposed between the first section and the third section.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
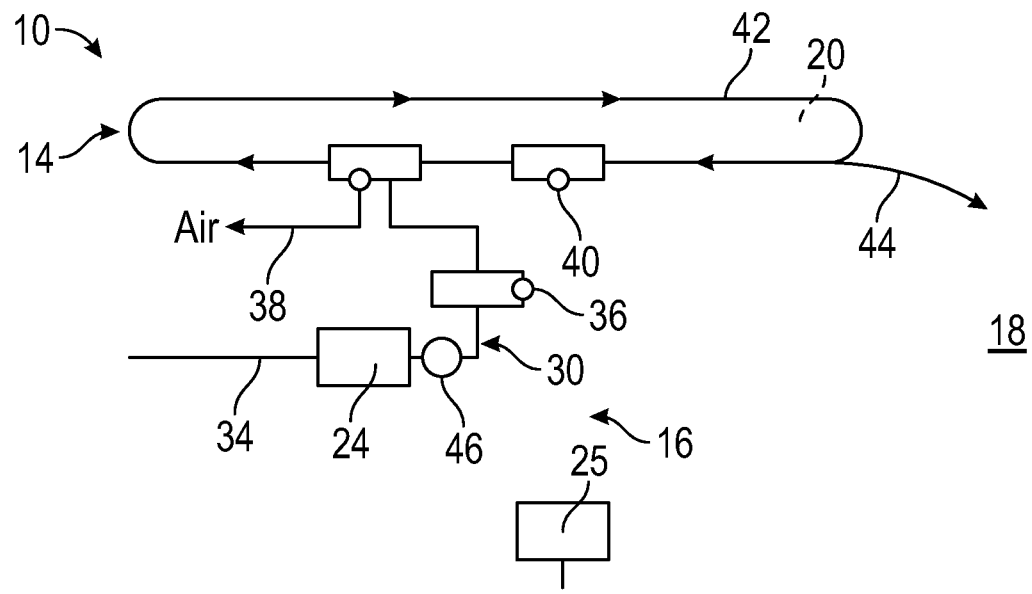
FIG. 1 depicts a partial glass view of an aircraft including a mechanical system having a pressure actuated switching valve, in accordance with a non-limiting example.

An aircraft in accordance with a non-limiting example is indicated generally at 10 in FIG. 1. Aircraft 10 includes a fuselage 14 supporting a pair of wings, one of which is shown at 16, and a tail 18. Fuselage 14 defines, in part, a cabin 20 that accommodates crew and/or passengers. Wing 16 supports a first engine 24 and a second engine 25. Fuselage 14 includes a cabin air system 30 that is connected to first engine 24. Cabin air system 30 may also be connected to second engine 25.

In a non-limiting example, cabin air system 30 includes an air intake 34 at first engine 24, an air conditioner 36, and an air mixing unit 38. An air filter 40 filters air passing into an air circulation circuit 42. An exhaust 44 discharges air from air circulation circuit 42 adjacent to tail 18. A mechanical system, shown in the form of a bleed air valve 46 provides an interface between first engine 24 and air conditioner 36.

Figure 2:
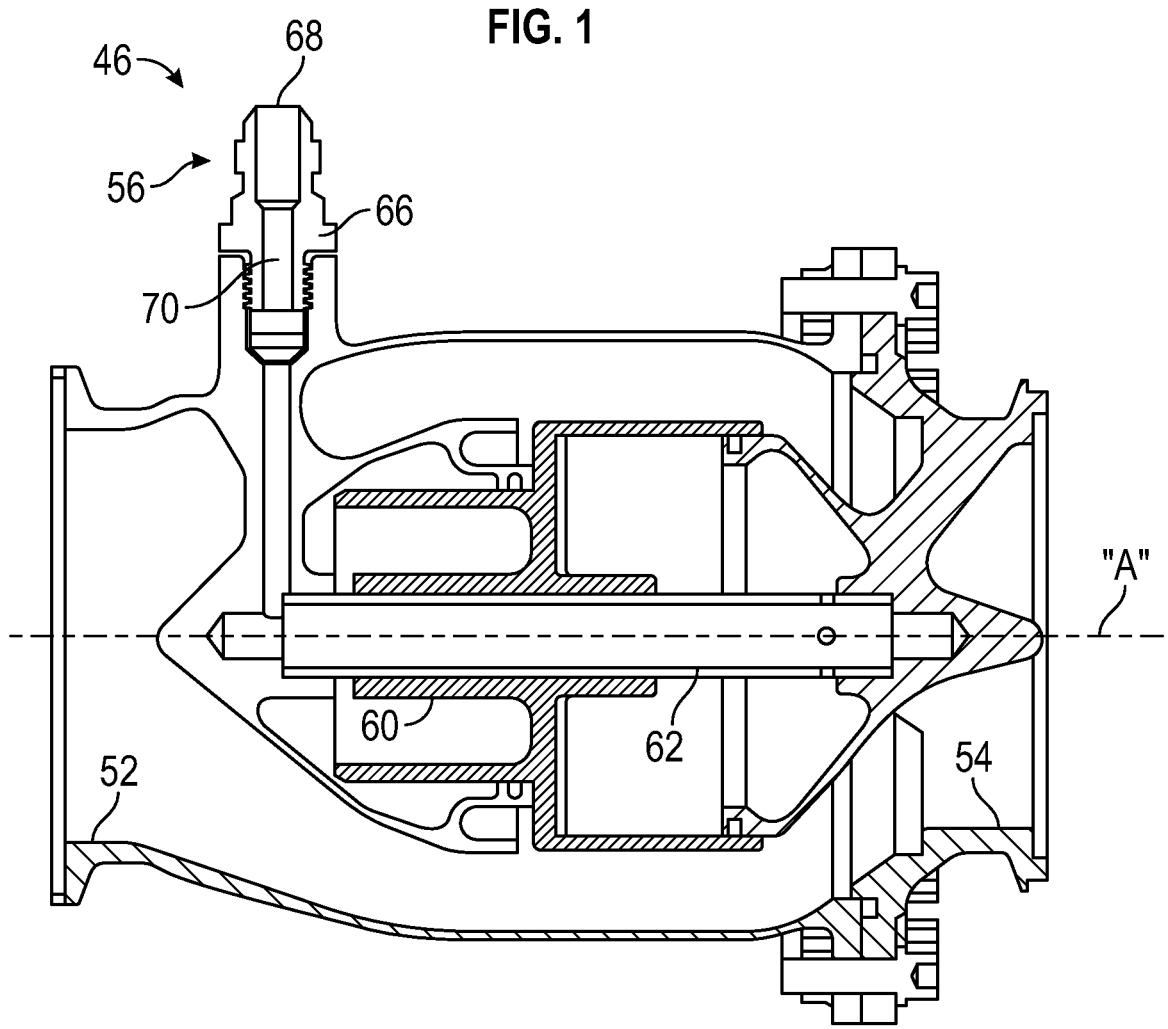
FIG. 2 is a cross-sectional side schematic view of the mechanical system of FIG. 1 including the pressure actuated switching valve, in accordance with a non-limiting example.

In a non-limiting example shown in FIG. 2, bleed air valve 46 includes a housing 50 including an inlet portion 52 and an outlet portion 54. A controlling air inlet 56 projects outwardly from 50 between inlet portion 52 and outlet portion 54. A valve member 58 is disposed in housing 50. Valve member 58 selectively connected inlet portion 52 and outlet 54. Valve member 58 includes a hub 60 supported on a shaft 62 having a shaft axis "A". In a non-limiting example, valve member 58 transitions on shaft 62 along the shaft axis "A" to fluidically connect outlet 54 to air passing from first engine 24 through air inlet portion 52 based on provided pressure from controlling air inlet 56.

In a non-limiting example, controlling air inlet 56 includes a pressure actuated switching valve 66 having an inlet 68 connected with upstream air from first engine 24 and an outlet 70 that is connected fluidly with shaft 62 such that the pressure at outlet 70 controls the position of valve member 58. In a non-limiting example shown in FIG. 3, pressure actuated switching valve 66 includes a valve chamber 78 having a first chamber portion 80, a second chamber portion 82, a third chamber portion 84, a fourth chamber portion 86, and a fifth chamber portion 88. In a non-limiting example, first chamber portion 80 is fluidically connected to inlet 68 and includes a first inner surface 91 defining a first inner diameter ID1, second chamber portion 82 is fluidically connected to outlet 70 and includes a second inner surface 94 having a second inner diameter ID2, third chamber portion 84 includes a third inner surface 98 defining a third inner diameter ID3, fourth chamber portion 86 includes a fourth inner surface 102 defining a fourth inner diameter ID4, and fifth chamber portion 88 includes a fifth inner surface 105 defining a fifth inner diameter ID5. In a non-limiting example, second chamber portion 82 includes a sealing surface 107 for the closed position. Fourth chamber portion 86 includes a sealing surface section 108 for the open position. Fifth chamber portion 88 includes a connection (not shown) to a downstream reference pressure, which could be ambient pressure.

In a non-limiting example, a valve member 110 is arranged in valve chamber 78. Valve member 110 includes a first section 112, a second section 114, and a third section 116. In a non-limiting example, first section 112 includes a first outer surface 118 having a first outer diameter "OD1", second section 114 includes a second outer surface 122 having a second outer diameter "OD2", and third section 116 includes a third outer surface 125 having a third outer diameter (OD3). In a non-limiting example, section 114 includes a first end portion 128 and a second end portion 130.

In a nonlimiting example, first outer diameter OD1 is greater than first inner diameter ID1, second outer diameter OD2 is closely matched to third inner diameter ID3, and third outer diameter OD3 is greater than the first outer diameter OD1, second outer diameter OD2, and second inner diameter ID2. At this point, it should be understood that the term "closely matched" is used to describe a clearance that exists between OD2 and ID3. The clearance allows valve member 110 to shift within valve chamber 78 while substantially preventing fluid from leaking past second section 114.

Figure 3:
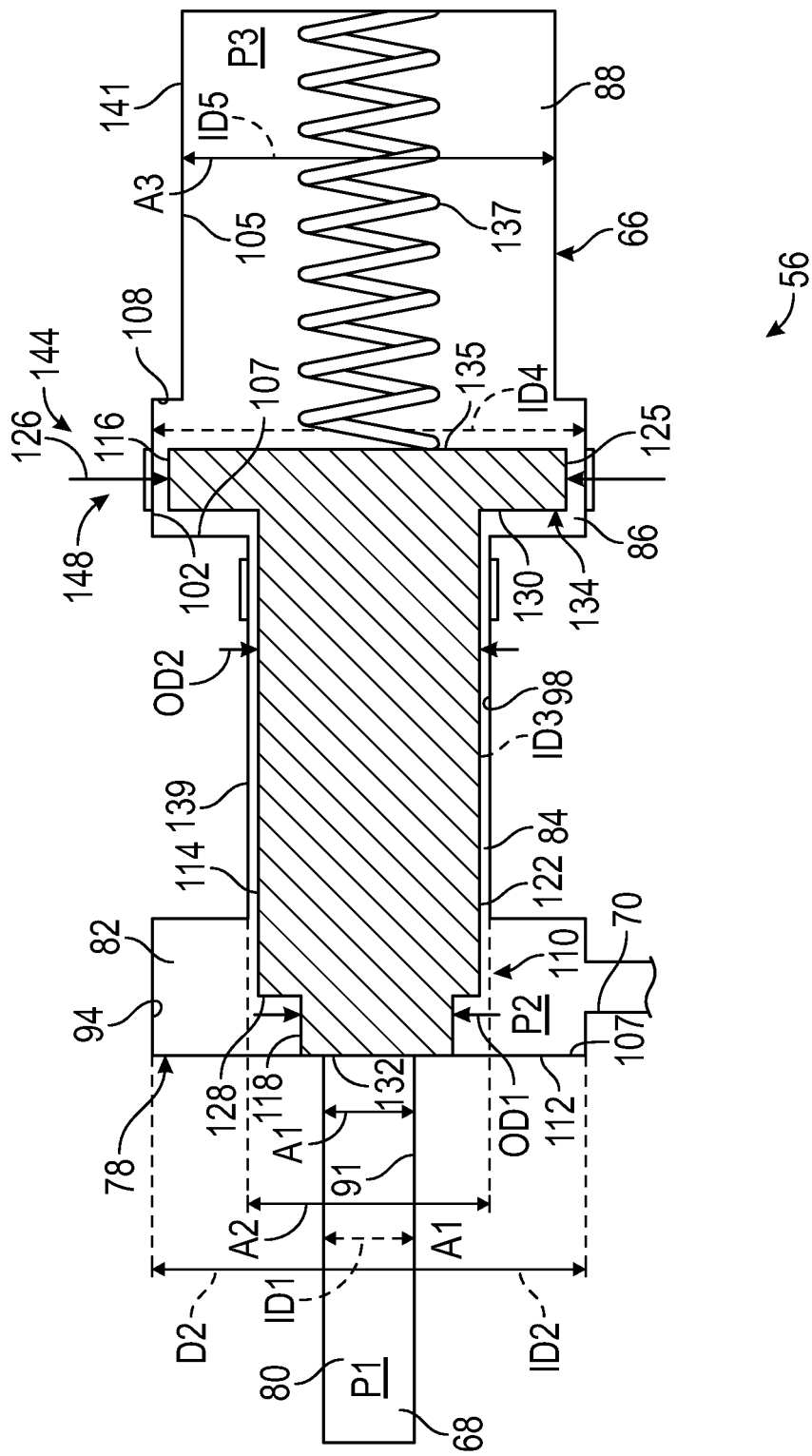
FIG. 3 depicts a schematic view of the pressure actuated switching valve in a closed position, in accordance with a non-limiting example.

In accordance with a non-limiting example, first end portion 128 is shown as being directly connected to first section 112 and second end portion 130 is shown as being directly connected to third section 116. It should however be understood that first section 12 may be joined to first end portion 128 through a first intermediate portion (not shown) and third section 116 may be connected to a second end portion 130 through a second intermediate portion (also not shown). In a non-limiting example, first section 112 includes an axially facing surface portion 132 and third section 116 includes a first axially facing surface section 134 and a second, opposing, axially facing surface section 135. In a non-limiting example, axially facing surface portion 132 selectively engages first sealing surface 107. A spring 137 is anchored in fifth chamber portion 88 and coupled to second axially facing surface section 135. Second axially facing surface section 135 selectively engages sealing surface section 108 when in the open position In one non-limiting example, valve chamber 78 may be a single unitary member or, in another non-limiting example, valve chamber 78 may be formed of two or more sections to promote installation of valve member 110. In a non-limiting example, valve chamber 78 may include a first chamber section 139 that includes first chamber portion 80, second chamber portion 82, third chamber portion 84, and part (not separately labeled) of fourth chamber portion 86. Valve chamber 78 may also include a second chamber section 141 that includes a second part (also not separately labeled) of fourth chamber portion 86 and fifth chamber portion 90. First chamber section 139 may be detachably connected to second chamber section 141 through, for example, a threaded connection 144. In a non-limiting example, valve member 110 may be formed from a single unitary piece or, as shown in FIG. 3 may includes a joint 148 connecting third section 116 with second section 114.

Figure 4:
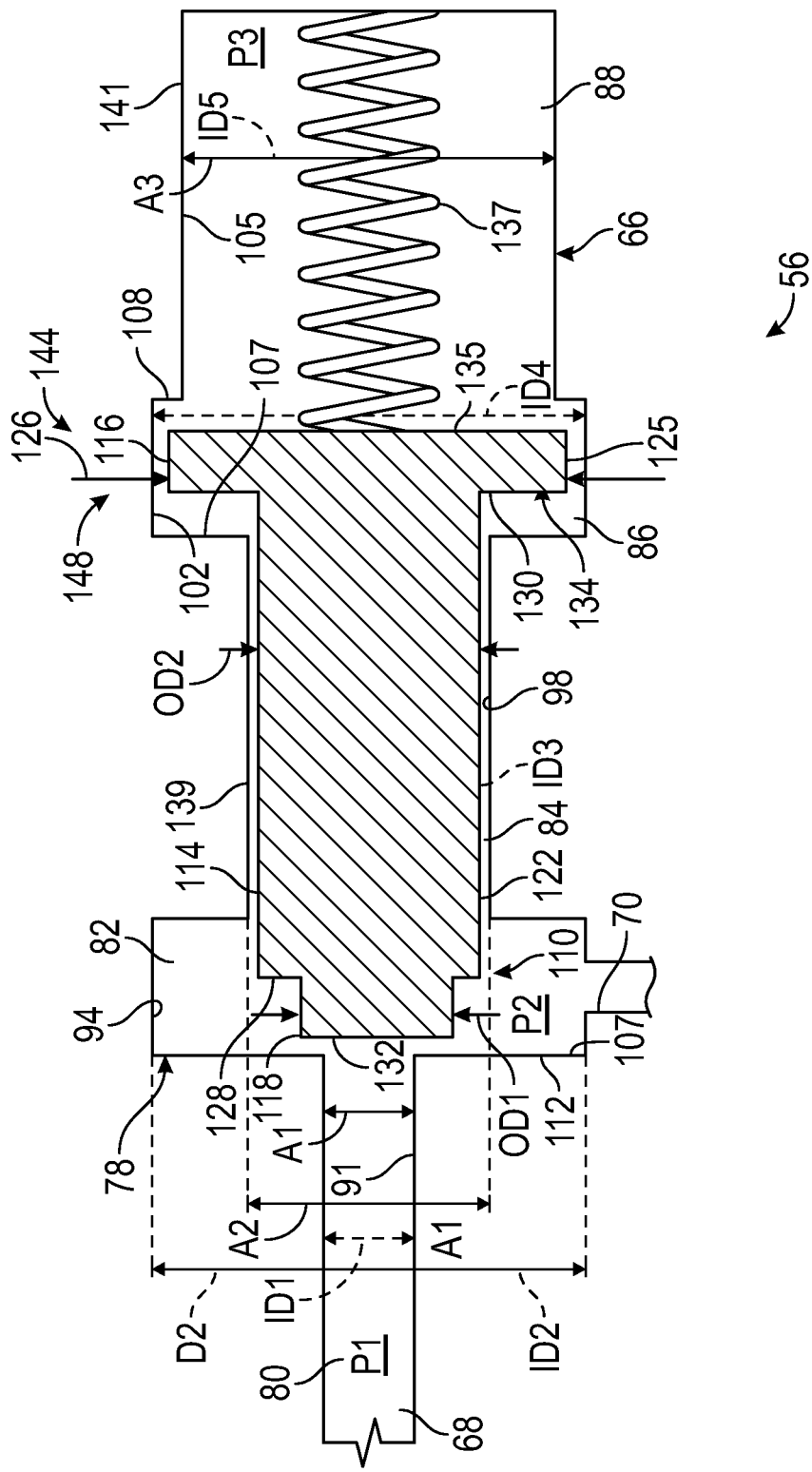
FIG. 4 depicts a schematic view of the pressure actuated switching valve of FIG. 3 moving between the closed position and an open position, in accordance with a non-limiting example.

In a non-limiting example, pressure actuated switching valve 66 is a "snap-action" valve. That is, when exposed to a selected fluid pressure, valve member 110 substantially instantaneously transitions from a closed position (FIG. 3) to an open position (FIG. 5) with virtually no time spent in and intermediate position (FIG. 4) i.e., a position in which valve member 110 is between the open and closed positions as shown in FIG. 4. When the selected fluid pressure is removed or lowered, valve member 110 substantially instantaneously transitions from the open position to the closed position. The "snap action" is achieved by allowing pressure in first chamber 68 to act on a series of staggered areas (Area_ID1, Area_ID2, Area_ID3) in a manner such that valve member 110 transitions from fully closed to fully open at effectively a single pressure.

In a non-limiting example, supply fluid from upstream engine 24 enters inlet portion 68 and acts on axially facing surface portion 132 to start valve member 110 moving towards the right. After the valve member 110 has lifted off of sealing surface 107, it very briefly resides in the intermediate position in FIG. 4. In this position, clearance at ID3 is sized in relation to the leakages in member 58 and a curtain area (not separately labeled) between face 107 and face 132. The clearance at ID3 is significantly lower than the clearance at the curtain area. Thus, the pressure at outlet 70 will be equal to the pressure at inlet 68. This pressure acting over the area prescribed by ID3 gives a positive force margin to ensure valve continues slewing through the mid stroke or intermediate position.

Figure 5:
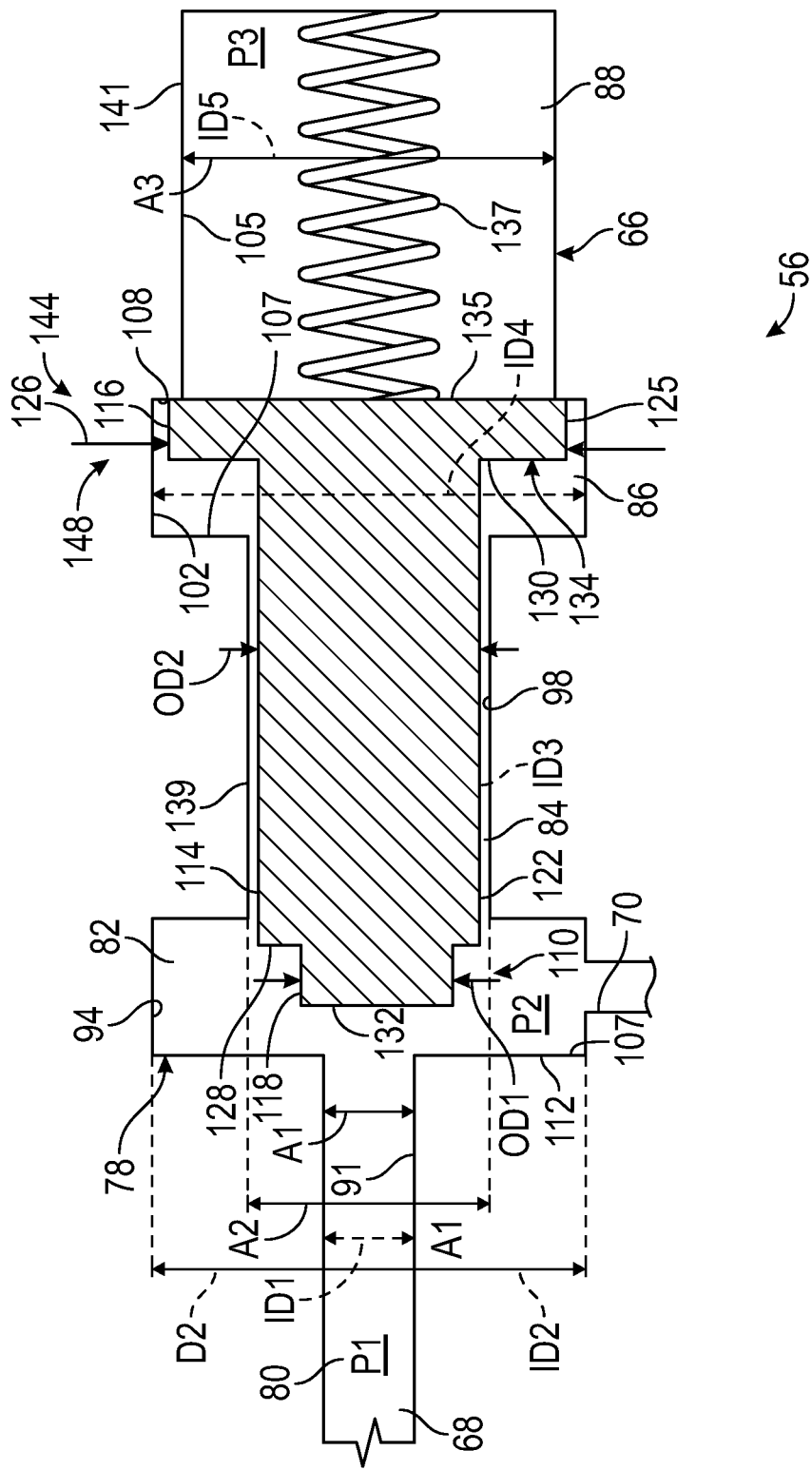
FIG. 5 depicts a schematic view of the pressure actuated switching valve of FIG. 4 in an open position, in accordance with a non-limiting example.

As valve member 110 approaches fully open position as shown in FIG. 5, second axially facing surface section 135 seats upon sealing surface section 108 and provides sealing between high pressures from inlet 68 and ambient pressure in fifth chamber 88. Once valve member 110 is sealed on sealing surface section 108, pressure at inlet 68 may expand through first, second, third, and fourth chambers 80, 82, 84, and 86 and provide a pressure load against first axially facing surface section 134 that keeps valve seated on sealing surface section 108.

When supply fluid pressure drops below a selected value, spring 137 and pressure in fifth chamber portion 88 act upon second axially facing surface to substantially instantaneously shift valve member 110 back to the closed position. The substantially instantaneously movement is achieved by forming OD3 of third section 116 to be larger than OD1 of first section 112 such that a force balance pressure of valve member 110 is the same in each of the three positions (closed, intermediate, and open)

In a non-limiting example, loading of spring 137 at the closed position, the intermediate position, and the open position is offset by an increased inner diameters ID2 and ID3. In a non-limiting example, $$\text{Spring\_Load\_Closed}/\text{Area\_ID1} = \text{Spring\_Load\_Intermediate}/\text{Area\_ID2} = \text{Spring\_Load\_Open}/\text{Area\_ID3}$$

wherein spring load is defined as the load applied by spring 137 to valve member 110 in each of the open position, the intermediate position, and the open position. This constant value of spring load divided by area provides a single pressure at which the valve translates between all three positions, in both the opening and closing directions.

With this arrangement, dwell time, or the amount of time valve member 110 is in the intermediate position, regardless of direction is minimized such that pressure actuated switching valve includes a low hysteresis. With the low hysteresis, undesired leakage from the inlet to the outlet is reduced so as to increase control responses and substantially eliminate control variances.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pressure actuated switching valve comprising:
a valve chamber, wherein the valve chamber includes
a first chamber portion defining an inlet, the first chamber portion having a first inner diameter;
a second chamber portion defining an outlet, the second chamber portion having a second inner diameter that is greater than the first inner diameter;
a first sealing surface defined between the first chamber portion and the second chamber portion,
a third chamber portion having a third inner diameter that is greater than the first inner diameter;
a fourth chamber portion having a fourth inner diameter that is greater than first the inner diameter, and
a fifth chamber portion;
a second sealing surface defined at an interface of the fourth chamber portion and the fifth chamber portion; and
a valve member slidingly arranged in the valve chamber, wherein the valve member includes
a first section arranged in the second chamber portion, the first section having a first outer diameter that is greater than the first inner diameter and being configured to selectively engage the sealing surface;
a second section arranged in the third chamber portion, the second section having a second outer diameter that is closely matched to the third inner diameter, and
a third section arranged in the fourth chamber portion, the third section having a third outer diameter that is greater than the first outer diameter, the second outer diameter, and the second inner diameter, and being configured to selectively engage the sealing surface.

2. The pressure actuated switching valve according to claim 1, further comprising: a spring arranged in the fifth chamber portion, the spring engaging the third section of the valve member, wherein the spring biases the valve member toward the sealing surface.

3. The pressure actuated switching valve according to claim 1, wherein the valve chamber includes a first chamber section and a second chamber section, wherein the first chamber section is mechanically connected to the second chamber section.

4. The pressure actuated switching valve according to claim 3, wherein the first chamber section is selectively detachably connected to the second section.

5. The pressure actuated switching valve according to claim 1, wherein the third section of the valve member is detachably connected to the second section of the valve member.

6. The pressure actuated switching valve according to claim 1, wherein the second outer diameter is greater than the first outer diameter.

7. The pressure actuated switching valve according to claim 6, wherein the third outer diameter is greater than the second outer diameter.

8. The pressure actuated switching valve according to claim 1, wherein a first end portion of the second section extends into the second chamber portion and a second end portion of the second section extends into the fourth chamber portion.

9. An aircraft comprising:
a fuselage;
at least one engine supported by the fuselage;
a mechanical system arranged in the fuselage, the mechanical system including a pressure actuated switching valve comprising:
a valve chamber, wherein the valve chamber includes
a first chamber portion defining an inlet, the first chamber portion having a first inner diameter;
a second chamber portion defining an outlet, the second chamber portion having a second inner diameter that is greater than the first inner diameter;
a first sealing surface defined between the first chamber portion and the second chamber portion,
a third chamber portion having a third inner diameter that is greater than the first inner diameter,
a fourth chamber portion having a fourth inner diameter that is greater than first inner diameter, and
a fifth chamber portion;
a second sealing surface defined at an interface of the first chamber portion and the second chamber portion; and
a valve member slidingly arranged in the valve chamber, wherein the valve member includes
a first section arranged in the second chamber portion, the first section having a first outer diameter that is greater than the first inner diameter and being configured to selectively engage the sealing surface,
a second section arranged in the third chamber portion, the second section having a second outer diameter that is closely matched to the third inner diameter, and
a third section arranged in the fourth chamber portion having a third outer diameter that is greater than the first outer diameter, the second outer diameter, and the second inner diameter.

10. The aircraft according to claim 9, further comprising: a spring arranged in the fifth chamber portion, the spring engaging the third section of the valve member, wherein the spring biases the valve member toward the sealing surface.

11. The aircraft according to claim 9, wherein the valve chamber includes a first chamber section and a second chamber section, the first chamber section being mechanically connected to a second chamber section.

12. The aircraft according to claim 11, wherein the first chamber section is selectively detachably connected to the second chamber section.

13. The aircraft according to claim 9, wherein the third section of the valve member is detachably connected to the second section of the valve member.

14. The aircraft according to claim 9, wherein the second outer diameter is greater than the first outer diameter.

15. The aircraft according to claim 9, wherein the third outer diameter is greater than the second outer diameter.

16. A method of operating a pressure actuated switching valve comprising:
introducing a fluid into a valve chamber having a first chamber portion including a first inner diameter, a second chamber portion having a second inner diameter that is greater than the first inner diameter, a third chamber portion having a third inner diameter that is greater than the first inner diameter, a fourth chamber portion having a fourth inner diameter that is greater than first inner diameter, and a fifth chamber portion;

snapping the pressure actuated switching valve open by unseating a first section of a valve member from a sealing surface defined between the first chamber and the second chamber portion with a first fluid pressure directed at the first section;

holding the pressure actuated switching valve open with the first fluid pressure acting on the first section and a second fluid pressure acting on a third section of the valve member in the fifth chamber portion;

passing a portion of the first fluid through an outlet connected to the second chamber portion;

reducing the first fluid pressure; and snapping the valve member closed seating the first section on the sealing surface with a spring positioned in the fifth chamber portion.

17. The method of claim 16, wherein snapping the valve member closed includes applying pressure to the third section of the valve member.

18. The method of claim 17, wherein applying pressure to the third section includes applying a biasing force to the third section with a spring.

19. The method of claim 16, wherein snapping the pressure actuated switching valve open includes passing a fluid from the fifth chamber portion into the fourth chamber portion around the third section.

20. The method of claim 19, further comprising: preventing fluid in the fourth chamber portion from passing into the third chamber portion with a second section of the valve member disposed between the first section and the third section.

* * * * *